(12) United States Patent
Kothnur et al.

(10) Patent No.: US 7,775,774 B2
(45) Date of Patent: Aug. 17, 2010

(54) SYSTEM AND METHOD FOR DRIVING A MONOPILE FOR SUPPORTING AN OFFSHORE WIND TURBINE

(75) Inventors: Vasanth Srinivasa Kothnur, Clifton Park, NY (US); David Deloyd Anderson, Glenville, NY (US); Danian Zheng, Clifton Park, NY (US); Mohamed Ahmed Ali, Clifton Park, NY (US); Kenneth Bradley Leland, Greer, SC (US)

(73) Assignee: General Electric Company, Niskayuna, NY (US)

(*) Notice: Subject to any disclaimer, the term of this patent is extended or adjusted under 35 U.S.C. 154(b) by 8 days.

(21) Appl. No.: 12/039,688

(22) Filed: Feb. 28, 2008

(65) Prior Publication Data
US 2008/0292408 A1    Nov. 27, 2008

Related U.S. Application Data

(63) Continuation of application No. 11/241,069, filed on Sep. 30, 2005, now Pat. No. 7,367,780.

(51) Int. Cl.
*F03B 11/00* (2006.01)

(52) U.S. Cl. .................... 416/244 R; 405/228

(58) Field of Classification Search .............. 415/4.3, 415/4.5, 908; 416/244 R, 244 A, DIG. 6; 52/40, 726.4, 741.14, 745.17; 405/228, 231, 405/232, 255, 251
See application file for complete search history.

(56) References Cited

U.S. PATENT DOCUMENTS

| 3,353,362 A | 11/1967 | Lubinski | 405/228 |
| 6,592,331 B1 | 7/2003 | Wobben | 416/244 R |

FOREIGN PATENT DOCUMENTS

WO    WO 03100178    12/2003

OTHER PUBLICATIONS

Anderson, Michael Rye et al.; Flange Connections Between Offshore Wind Turbine Towers and Mono Pile Foundations, Design and Testing Criteria, Technical Development, 15 pages.

*Primary Examiner*—Edward Look
*Assistant Examiner*—Dwayne J White
(74) *Attorney, Agent, or Firm*—Fletcher Yoder PC

(57) ABSTRACT

A method for installing an offshore wind turbine system includes driving a cylindrical annular monopile or a substructure into the soil. The monopile includes a flanged portion configured to support a wind turbine tower or a superstructure. The flanged portion extends radially from a peripheral surface of the monopile. The method further includes mounting a wind turbine tower directly on to the monopile, wherein the wind turbine is supported by the flanged portion of the monopile.

16 Claims, 11 Drawing Sheets

| PILE COMPRESSIVE STRESS (MPa) | NUMBER OF BLOWS | FLANGE STRESS AMPLITUDE (MPa) (SCF=1.672) | FLANGE FATIGUE UTILIZATION AWS (API) |
|---|---|---|---|
| 102 | 11200 | 301 | 7.7% |
| 127 | 6300 | 319 | 5.2% |
| 134 | 4700 | 339 | 4.5% |
| 145 | 3600 | 364 | 4.4% |
| 157 | 2500 | 394 | 3.9% |
| 169 | 2100 | 424 | 4.1% |
| 178 | 1800 | 446 | 4.2% |
| 189 | 1700 | 474 | 4.5% |

FIG. 10

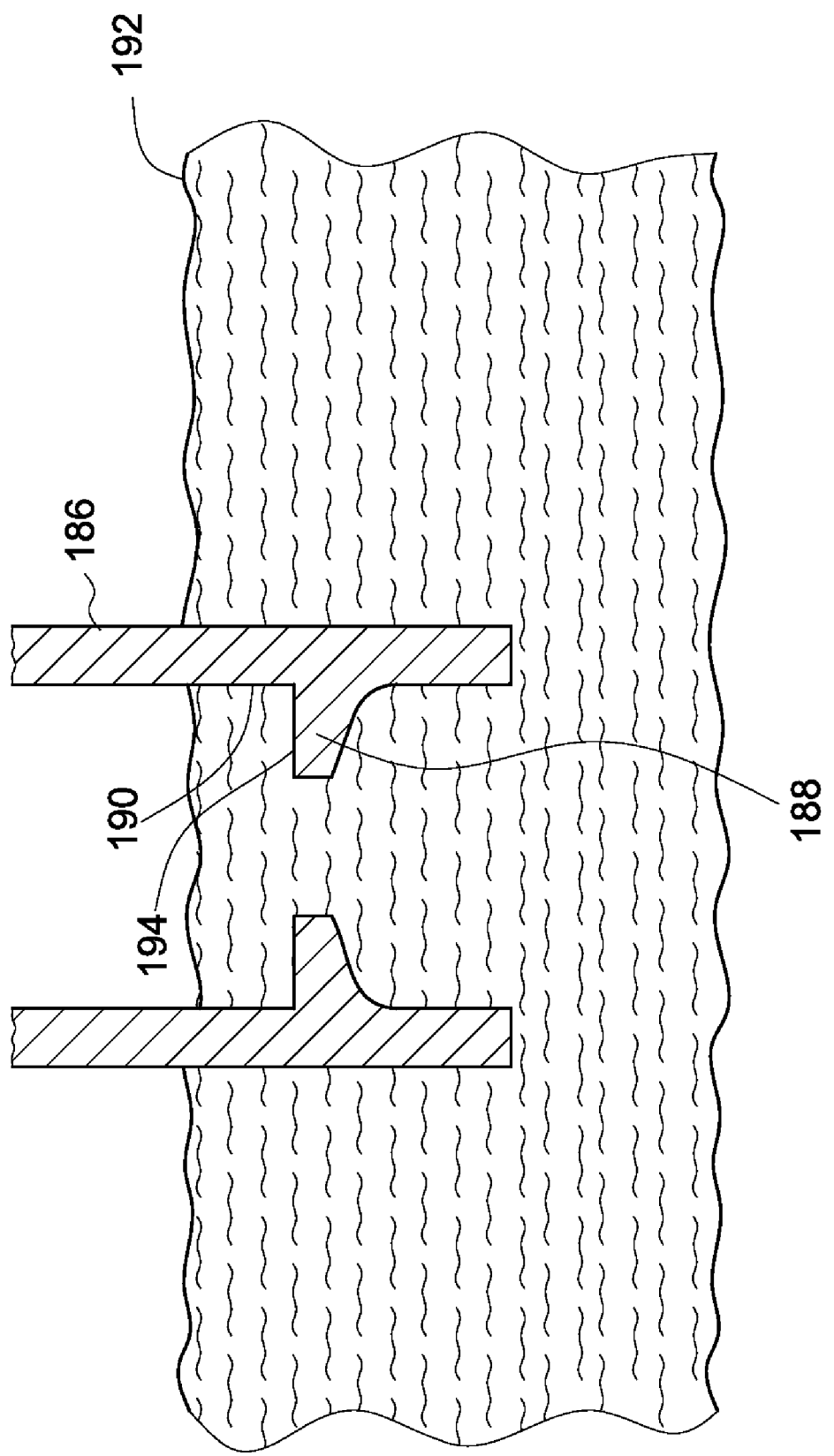

SYSTEM AND METHOD FOR DRIVING A MONOPILE FOR SUPPORTING AN OFFSHORE WIND TURBINE

CROSS REFERENCE TO RELATED APPLICATIONS

This application is a Continuation of U.S. patent application Ser. No. 11/241,069, entitled "System and Method for Driving a Monopile for Supporting an Offshore Wind Turbine", filed Sep. 30, 2005, which is herein incorporated by reference.

BACKGROUND

The invention relates generally to wind turbines, and particularly to systems and methods for mounting a wind turbine superstructure to a pile foundation or a substructure at an offshore location. Specific embodiments of the present technique provide configurations, designs, and methods for driving a flanged pile (or caisson) suitable for supporting a wind turbine at an offshore location.

Wind turbines are generally regarded as an environmentally safe and desirable source of renewable energy. In summary, a wind turbine harnesses the kinetic energy of wind and transforms this kinetic energy into electrical energy. Thus, electrical power can be generated with virtually zero emissions, unlike existing natural gas-fired or coal-fired power generation technologies. To maximize the efficacy of power generation and to simplify connection to a power grid, several wind turbines are often located in proximity to one another in what are generally referred to in the pertinent art as "wind farms." Advantageously, these wind farms are located in regions having relatively strong winds, such as, for example, at offshore locations.

An important criterion for establishing competitive offshore wind farms includes development of cost efficient foundations for the wind turbines. Typically, the foundation structure for a wind turbine at an offshore location comprises a monopile. A traditional monopile generally has a long cylindrical caisson that is assembled in sections on-shore and subsequently driven to the required penetration depth at the turbine's offshore location. Using the monopile as a foundation structure is advantageous because, for one reason, the same heavy lift equipment can be used for both the driving of the large monopile, and the installation of the wind turbines, thus facilitating an assembly line type of operation involving relatively few and standardized operations. Oftentimes these heavy lift equipment are procured as rentals by the production company, thus minimizing the usage time of these heavy lift equipment can reduce overall costs for the production company.

In certain offshore installations, the monopile is provided with a transition piece comprising a flanged structure attached to the top of the monopile. The transition piece provides a mating surface to which a wind turbine tower may be bolted. The transition piece may also be adapted to compensate for excess inclination in the driven monopile (an inclination in the superstructure of less than 0.5 degrees is generally desirable). For an offshore installation of a wind turbine to be cost efficient, it is desirable that the wind turbine tower is mounted on the monopile immediately after the monopile is driven. Unfortunately, past methods for mounting the transition piece on to the monopile which include grouting, swaging, or in-situ welding, generally require a significant amount of time, whether due to curing or installation, etc. That is, all of these traditional processes are relatively expensive and time consuming, leading to considerable idling of rented heavy lift equipment. Moreover, grouting involves a large surface overlap between the transition piece and the caisson (sometimes as high as 12-15 meters of overlap), leading to considerable expenditure on steel due to increased size of the transition piece.

A possible solution to the above problem could be to drive the monopile with a flanged structure welded at the top. However, at the time of driving the monopile by a hydraulic hammer, large accelerations and stresses are induced in the monopile, which may cause large deformations on the flange surface. These deformations may be so large that they are beyond the accepted tolerances for flange surfaces. With these accelerations, fatigue damage may also accumulate that may adversely impact the life of the foundation system.

Accordingly, there exists a need for a cost effective method for installing a foundation structure for a wind turbine at an offshore location.

BRIEF DESCRIPTION

The present technique provides a novel and cost effective system and method for installing a wind turbine at an offshore location. Briefly, according to one aspect, a method for installing a wind turbine is provided. The method includes driving a cylindrical annular monopile or a substructure into the soil. The monopile includes a flanged portion configured to support a wind turbine tower or a superstructure. The flanged portion extends radially from a peripheral surface of the monopile. The method further includes mounting a wind turbine tower directly on to the monopile, wherein the wind turbine is supported by the flanged portion of the monopile.

To effectuate such installation, a variety of exemplary monopiles and monopile systems are provided. For instance, in accordance with one embodiment, monopiles having flanged portions extending radially from inner and/or outer peripheral surfaces at a point intermediate to the ends of the monopiles are provided.

In accordance with yet another embodiment, the use of protective shims for flanges located at an end of the monopile is provided. Even further, in accordance with yet another embodiment, monopiles having dedicated flanges for driving and tower mounting are provided. Of course, the foregoing are merely examples, some of which are discussed in further detail below. Indeed, the foregoing is by no means an exhaustive list of embodiments.

DRAWINGS

These and other features, aspects, and advantages of the present invention will become better understood when the following detailed description is read with reference to the accompanying drawings in which like characters represent like parts throughout the drawings, wherein:

FIG. 10 is an exemplary table showing the number of blows required to drive a typical offshore wind turbine foundation monopile versus a given stress level within the monopile due to the hammer impact;

FIG. 18 is a cross-sectional view illustrating a flanged monopile for improved bearing surface, according to aspects of the present technique.

DETAILED DESCRIPTION

As described in detail below, embodiments of the present technique facilitate mounting a superstructure such as a wind turbine tower directly on to a monopile immediately after installation of the monopile at an offshore site. In accordance with aspects of the present technique, the foundation structure for a wind turbine includes a pre-flanged monopile. Specific embodiments of the present technique function to facilitate driving a flanged monopile into the soil such that the flanged portion of the monopile is unaffected by the impact of the driving load and is configured to support a superstructure such as the wind turbine tower. Exemplary embodiments of the present technique are discussed in detail below with reference to FIGS. 1-12. Of course, it is worth noting that the following description describes exemplary embodiments, and the appended claims are not intended to be limited to the embodiments described herein.

Figure 1:
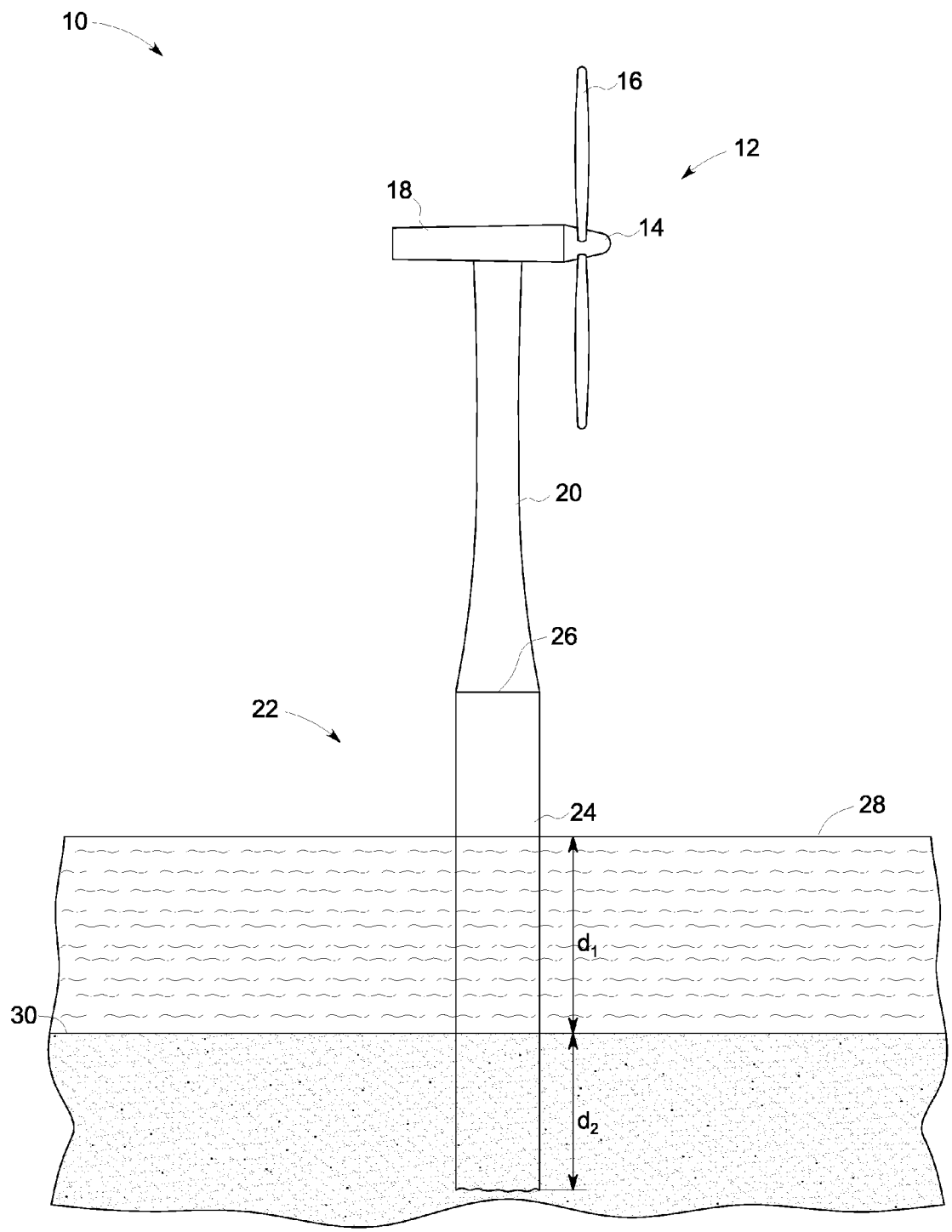
FIG. 1 is a diagrammatical illustration of an offshore wind turbine system, in accordance with aspects of the present technique.

Turning now to the drawings, FIG. 1 illustrates an offshore wind turbine system 10, in accordance with one embodiment of the present technique. The wind turbine system 10 includes a wind turbine generator 12 comprising a rotor 14 having multiple blades 16. Various electrical and mechanical components of the wind turbine generator 12, such as the drive train and electrical generator, are housed in a nacelle 18. The rotor 16 and the nacelle 18 are mounted atop a wind turbine tower 20 that exposes the blades 16 to the wind. The blades 16 facilitate transformation of kinetic energy of the wind into a rotation motion of a shaft that drives a generator (not shown), to produce electrical power. These components, among others, represent the superstructure of the wind turbine.

The tower 20, the nacelle 18 and the rotor 14 (i.e. the superstructure) are mounted on a foundation or substructure 22. In the illustrated embodiment, the foundation structure or substructure 22 includes a monopile or caisson 24 upon which the tower 20 or the superstructure is mounted. The monopile 24 is generally an annular cylindrical column, extending from a base or deck 26 of the tower 20 to a depth '$d_1$' below a water level 28. In the illustrated embodiment, the monopile 24 is driven into the soil to a depth '$d_2$' into the sea-bed, below a soil surface 30, also referred to as a mud line. Typical use for such configurations would be for conventional (un-reinforced, un-guyed) monopiles, though preflanged piles as described in the embodiments below may have utility for other configurations as well, for example tripod like base assemblies.

According to the various embodiments of the present technique illustrated below, the monopile 24 is provided with a flanged portion to facilitate mounting of the superstructure directly on the monopile 24 or on the substructure, thus obviating the need to grout a transition piece (generally formed from steel) as has often been done in the past. Advantageously, the present technique significantly reduces the idle-time of rented heavy lift equipment, for instance, and is also significantly inexpensive in terms of material (steel) costs.

Figure 2:
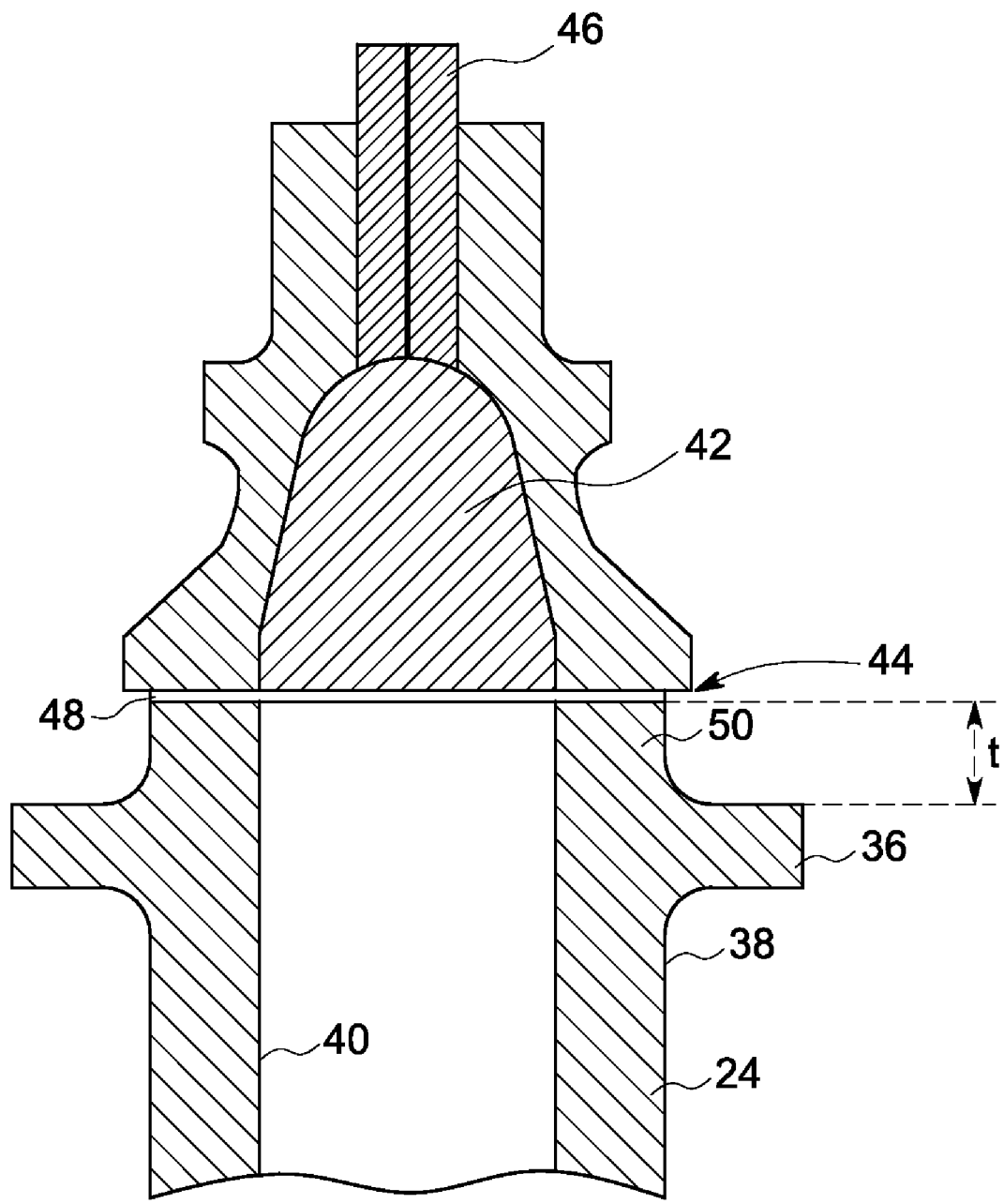
FIG. 2 is a cross-sectional view illustrating a flanged monopile and an anvil, in accordance with one embodiment of the present technique.

FIG. 2 is a cross-sectional view illustrating an exemplary monopile or caisson 24 having a flanged portion 36, in accordance with aspects of the present technique. As discussed above, the exemplary monopile 24 is a cylindrical annular pile, generally formed from steel. In the illustrated embodiment, the flanged portion 36 extends radially outwardly from the outer surface 38 of the monopile 24. As illustrated, the flanged portion is located axially inboard of an end of the monopile, as is discussed further below. In alternate embodiments, which are described hereinafter, the flanged portion may include an annular surface extending radially inwardly from a peripheral inner surface 40 of the monopile 24. During the process of driving the monopile 24 into the soil, an anvil 42 is positioned over a top end 44 of the monopile 24. In the exemplary embodiment illustrated, the anvil 42 is an anvil manufactured by MENCK GmbH, having a hollow conical inside cross-section. As is appreciated by those of ordinary skill in the art, information regarding such anvils is available from MENCK GmbH, of Kaltenkirchen, Germany. The monopile 24 is driven into the soil via a hammer 46, typically a hydraulic hammer. The base 48 of the exemplary anvil 42 has a diameter exceeding the diameter of the hammer 46 and acts to distribute the impact of a hammer blow uniformly to the monopile 24. In the present description, a "blow" is defined as a transfer of load from the hammer 46 to the anvil 42. During a "blow", the hammer 46 may be lifted by the pressure of a hydraulic fluid supplied to the hammer 46 by a power unit (not shown). When the fluid pressure is removed, the hammer 46 descends and produces a downward stroke on the anvil 42. In certain embodiments, additional force may be added to the downward stroke by hydraulic pressure (acting in the opposite direction now), increasing the acceleration of the hammer 46. In accordance with aspects of the present technique, the flanged portion 36 is configured such that flange damage is minimized during driving of the monopile 24 into the soil. For example, according to one aspect of the present technique, the flanged portion 36 is located at a distance 't', away from the top end 44 of the monopile 24, thus the flanged portion 36 is minimally affected by the impact of the driving load on the monopile 24. Additionally, flange damage can be mitigated by suitably designing the flange to minimize dynamic stress concentrations so that the driving system can hammer with normal stress levels in the monopile without causing unacceptably high stress levels in the flange. For instance, junction surfaces between the flange and the remainder of the pile may be curved, to better distribute stress concentrations formed by abrupt corners. Advantageously, impact of the hammer is borne by an unutilized portion 50 of the monopile, such that surface finish of the upper surface of the flanged portion 36 is preserved, to facilitate mounting of the wind turbine superstructure on the monopile 24, and, thus, on the substructure. Various embodiments of the present technique comprise different configurations and locations of the flanged portion with respect to the anvil, such that hammer energy is transmitted to the monopile without damaging the flange. A few exemplary embodiments are discussed below.

Based on the configuration of the flange, a flanged monopile, in accordance with the present technique, may comprise a radially inward flanged configuration, a radially outward flanged configuration, or a balanced flange configuration (i.e. having both radially inward and outward flanged portions). Further, based on the location of the flanged portion along the length of the monopile, a flanged monopile may have a mid-pile flange configuration or a top flange configuration.

Figure 3:
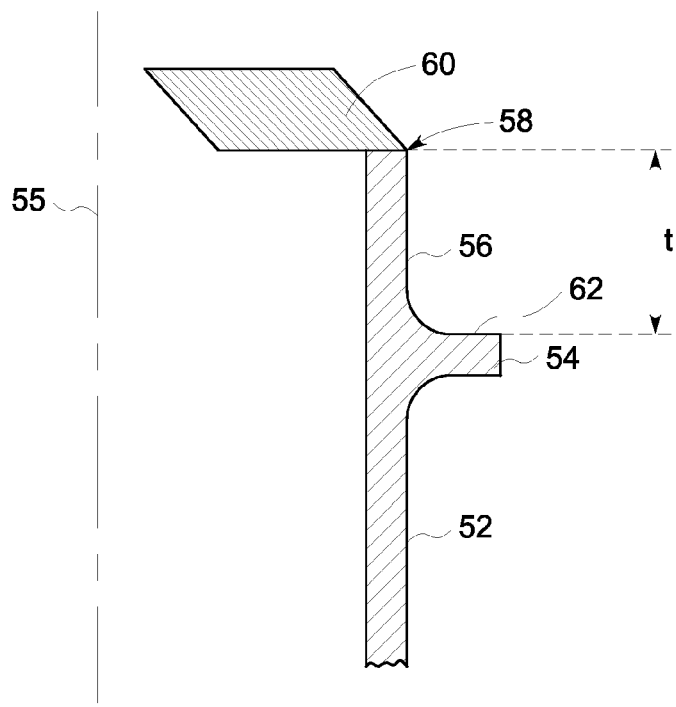
FIG. 3 is a cross-sectional view illustrating a half-section of an outward mid-pile flanged configuration, according to aspects of the present technique.

FIG. 3 illustrates a monopile 52 having a flanged portion 54 extending radially outward from a centre line 55 from an outer surface 56 of the monopile 52. The illustration shows a half-section of the monopile 52 on one side of the centre line 55. As illustrated, the flanged portion 54 is located away from the top end 58 of the monopile 52 upon which an anvil 60 that transmits the hammer energy to the monopile 52 acts. Such a configuration is also referred to as mid-pile flange configuration. The distance 't' between the top end 58 and the location of the flanged portion 54 is appropriately selected such that hammer energy is transmitted to the monopile 52 without substantially damaging the flanged portion 54. Surface quality of the upper surface 62 of the flanged portion 54 is thus preserved, such that that a superstructure, such as a wind turbine tower can be mounted on the flanged portion 54, and thus, after the monopile 52, or the substructure, is driven into the soil to the required depth. Advantageously, this outward flange configuration facilitates simplified mounting/dismounting of the superstructure with respect to the substructure during installation and servicing.

Figure 4:
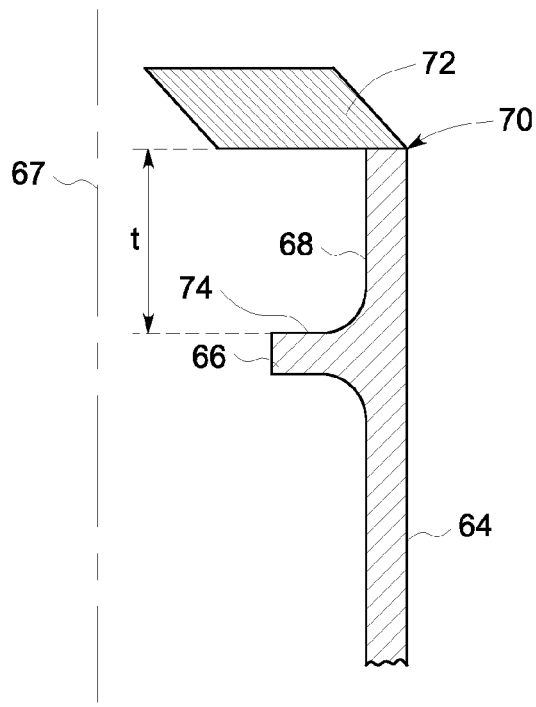
FIG. 4 is a cross-sectional view illustrating a half-section of an inward mid-pile flanged configuration, according to aspects of the present technique.

FIG. 4 illustrates a half-section of a monopile 64 having a flanged portion 66 extending radially inward toward a center line 67 from an inner surface 68 of the monopile 64. As in the above-described embodiment, the monopile 64 comprises a mid-pile flange configuration, wherein the flanged portion 66 is located at a distance 't' away from the top end 70 of the monopile 64,' to minimize damage to the flanged portion 66 due to hammer energy transmitted by the anvil 72. Once driven, the monopile 64, and, thus, the substructure is ready to support the superstructure on the annular and radially inwardly extending surface 74 of the flanged portion 66. The radially inward configuration of the flanged portion 66, advantageously, minimizes corrosion of the flange, such that surface quality of the upper surface 74 is preserved.

Figure 5:
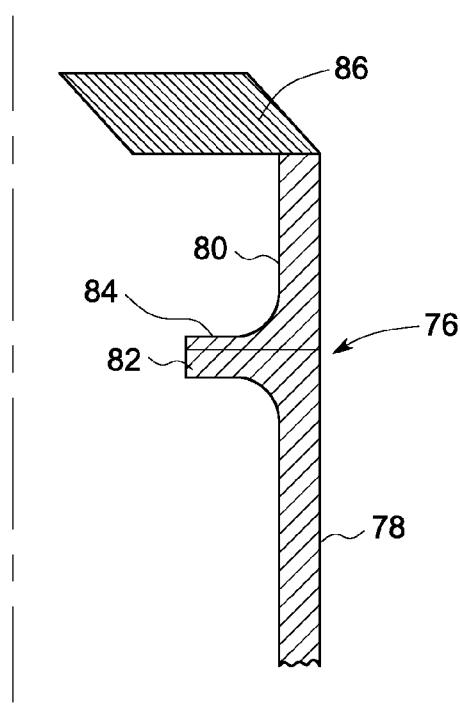
FIG. 5 is a cross-sectional view illustrating a half-section of a two-piece mid-pile flanged configuration, according to aspects of the present technique.

Instead of having the mid-pile flange as a single piece, the mid-pile flange can be made in two pieces. FIG. 5 illustrates a half-section of a monopile 76 formed of two separate flanged piles, 78 and 80. The bottom portion 78 includes a flanged surface 82 at its top end and the top portion 80 has a flanged surface 84 at its bottom end that interfaces with the flanged surface 82 to form a unitary flange. During the pile driving process, an anvil 86 is placed over the top portion 80, and the bottom portion 78 is driven into the soil due to the energy of the hammer blows transmitted by the top portion 80. After the driving process is completed, the top portion 80 including the flanged surface 84 is removed and the superstructure is subsequently mounted on the flanged surface 82 and substructure, which is protected from the impact of the hammer blows. Moreover, to reduce load stresses, the monopile and substructure may include reinforced gusset plates, and the flanges may have structural characteristics to reduce stresses.

Figure 6:
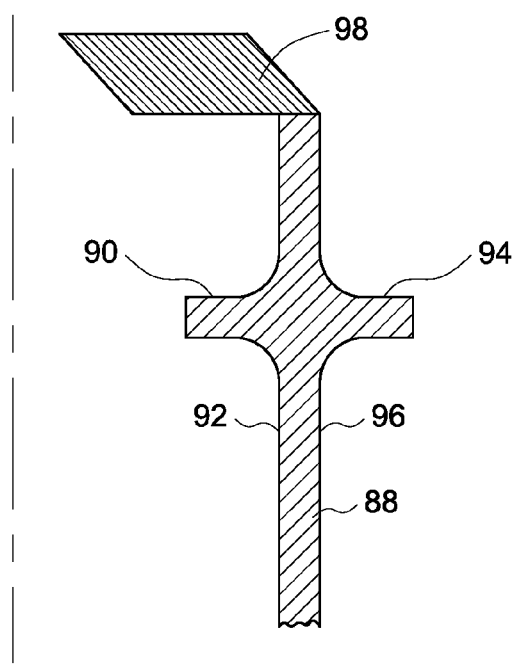
FIG. 6 is a cross-sectional view illustrating a half-section of a balanced mid-pile flanged configuration, according to aspects of the present technique.

In certain applications, dynamic bending stresses may be increased by a lack of inertial balance due to having a flange extend either toward or away from the center of the pile. In such applications it may be advantageous to design the flange to radially extend both inside and outside of the pile, in a balanced manner. FIG. 6 illustrates half-section of a monopile 88 having a balanced mid-pile flanged configuration. It includes a first flanged portion 90 extending radially inward from an inner peripheral surface 92 of the monopile 88, and a second flanged portion 94 extending radially outward from an outer peripheral surface 96 of the monopile 88. The above-described configuration advantageously facilitates balancing of inertial loads across the monopile 88 transmitted by an anvil 98, for instance. This balanced configuration may also include two separate pieces to form the flange, with the upper portion acting as a sacrificial portion.

In accordance with aspects of the present technique, for mid-pile flanged configurations, the flange and the surrounding parts are suitably shaped to minimize stress concentrations and allow the pile driving pulse to pass through the flanged area with minimal stress concentrations.

Figure 7:
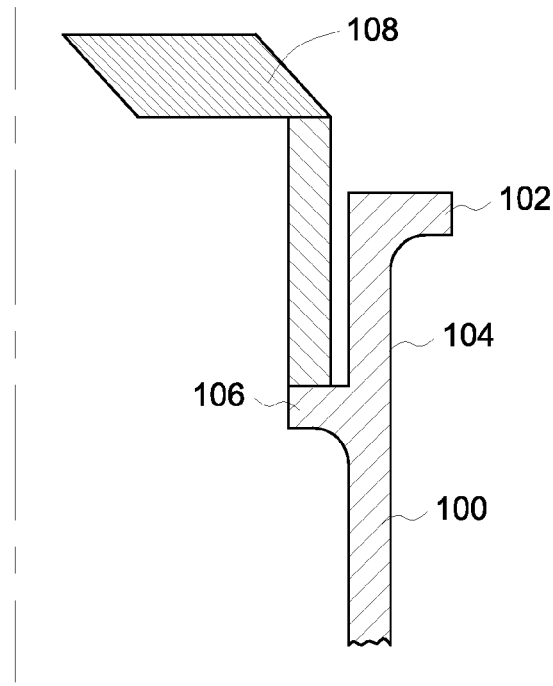
FIG. 7 is a cross-sectional view illustrating a half-section of a top-pile flanged configuration using a secondary flange, according to aspects of the present technique.

In certain embodiments, the flanged portion may be located at the top of the monopile (top-pile flanged configurations). FIG. 7 illustrates a half-section of a monopile 100 having a top-flanged portion 102 (main flange), extending radially outward from a peripheral outer surface 104 of the monopile 100 and configured to support the superstructure. The monopile 100 also includes a secondary flanged portion 106, extending radially inwardly. The secondary flanged portion 106 is located below the main flange 102, such that during the act of driving the pile i.e., the impact of the hammer energy transmitted by the anvil 108, is borne by the secondary flange 106, with minimal impact on the main flange 102. The secondary flange 106 is suitably designed to withstand the driving loads, while the main flange 102 is suitably designed to withstand the design loads of the complete wind turbine system, particularly the superstructure.

Figure 8:
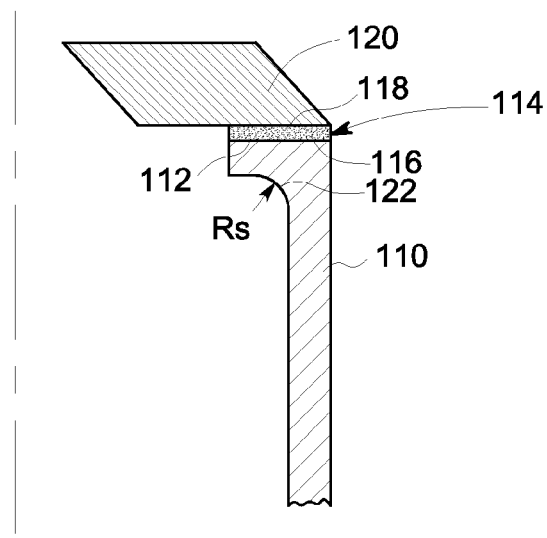
FIG. 8 is a cross-sectional view illustrating a half-section of a top-pile flanged configuration using a protective shim, according to aspects of the present technique.

FIG. 8 illustrates an alternate embodiment of a top-pile flanged configuration, in accordance with aspects of the present technique. As illustrated in the half-section view, a monopile 110 includes a radially inwardly extending flanged surface 112 at or near its top end 114. The flanged surface 112 is adapted to support a superstructure. In this embodiment, damage to the flanged surface 112 is avoided by the use of a protective and disposable metallic shim 116 located between the flanged surface 112 and a bottom surface 118 of an anvil 120. The properties of the shim 116 are such that they are impedance matched with the anvil 120 as regards stress wave propagation to minimize driving energy losses. In addition, the yield stress of the metallic shim 116 is chosen to be less than that of the material of anvil 120 or that of the flange 112. This leads to plastic deformations occurring in the shim 116 and not the flange 112 or anvil 120. An exemplary material for this protective shim would be copper as it is softer than steel but has substantially similar dynamic impedance. However, other materials, such as aluminum, low strength plain carbon steels, or combinations thereof may also utilized to form the shim 116.

Figure 9:
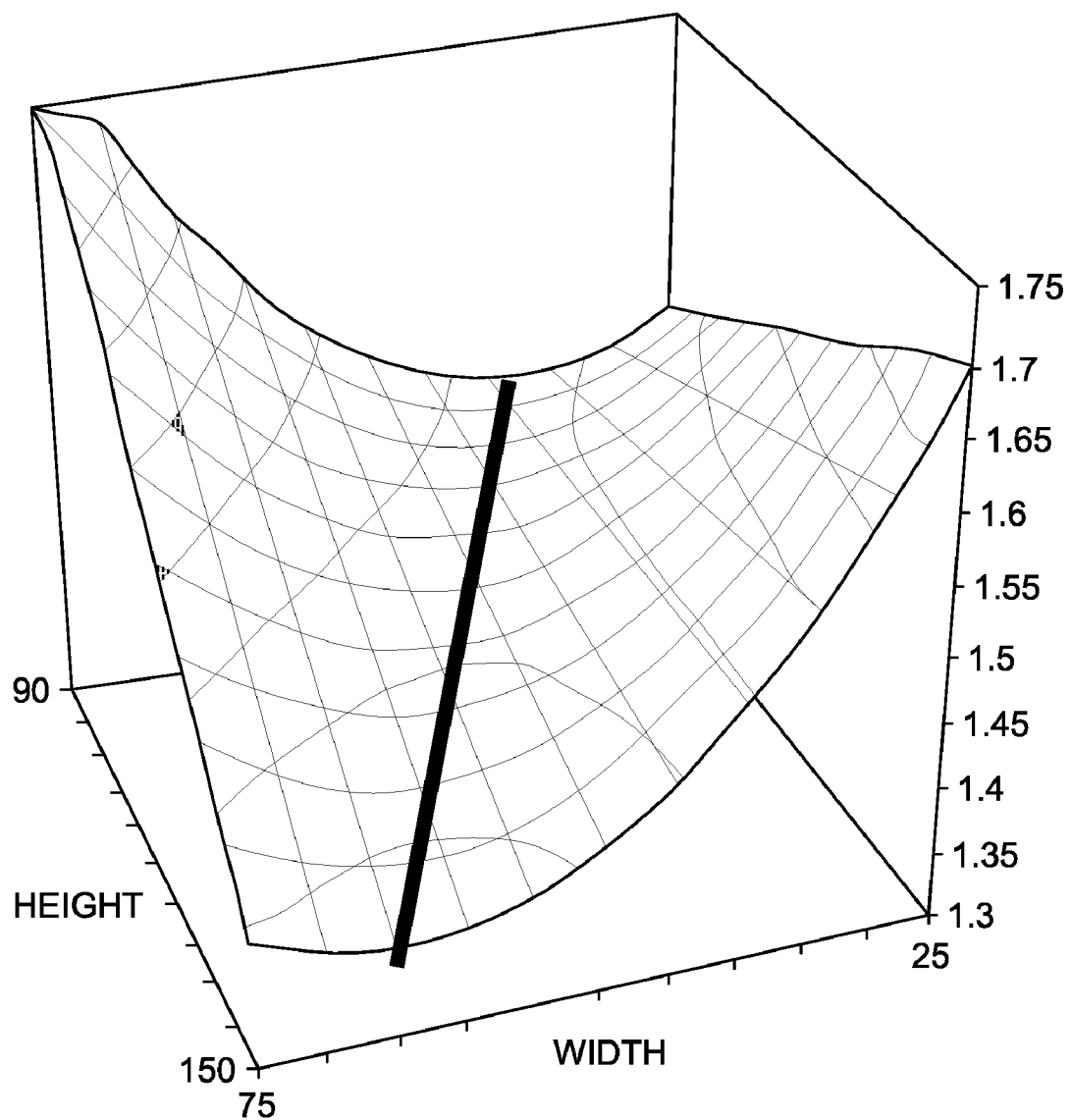
FIG. 9 is a graphical illustration of an exemplary variation of flange dynamic stress concentration factor (SCF) in comparison with height and width of a spline-shaped curvature.
Figure 11:
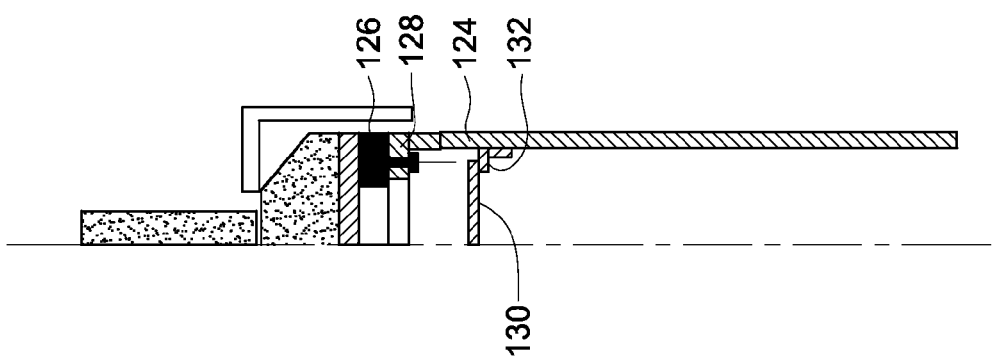
FIG. 11 is a cross-sectional view illustrating a half-section of a flanged monopile having a disposable shim bolted on to the flanged portion, according to aspects of the present technique.

Stress concentration at the intersection 122 of the flange 112 and the monopile 110 may be minimized by employing a spline-shaped curvature (denoted by $R_S$) at the intersection 122 or other optimal geometry. FIG. 9 graphically illustrates an exemplary variation of flange dynamic stress concentration factor (DSCF) with height and width of the spline shaped curvature at the intersection 122. Flange stress concentration factor is obtained by dividing the peak flange stress by the peak monopile stress during an initial pulse due to a driving load. FIG. 10 is an exemplary table showing the number of blows required to drive a typical offshore wind turbine foundation monopile versus a given stress level within the monopile due to the hammer impact. Given the flange DSCF, the peak stress in the flange is given by the DSCF times the peak pile stress. With the flange stress and number of cycles (blows) thus estimated, the fatigue utilization of the flange during pile driving 112 can be estimated. According to an aspect of the present technique, the disposable shim may be securely fixed to the flanged portion, for instance, by bolting it to the flanged portion before driving the monopile. FIG. 11 illustrates a half-section of a monopile 124 having a disposable shim 126 bolted on to a pre-welded flanged section 128. The illustrated arrangement thus protects the top surface of the flanged portion 128 during driving of the monopile, while restricting relative movement of the shim 126 and preventing the disposable shim 126 from displacing vibrations due to the hammer blows. Additionally an airtight platform 130 may be installed on pre-welded continuous annular rings 132 to limit corrosion within the pile by preventing air exchange.

Figure 12:
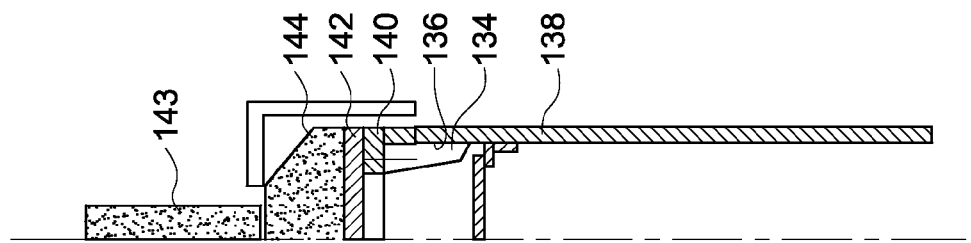
FIG. 12 is a cross-sectional view illustrating a half-section of a flanged monopile having gusset plates adapted to stiffen the flanged portion, according to aspects of the present technique.

In certain embodiments, stiffness of the flanged portion may be enhanced by the use of welded gusset plates as shown in FIG. 12. In this embodiment, one or more gusset plates 134 are provided along an inner surface 136 of monopile 138 and adjacent to a flanged portion 140 of the monopile. During driving of the monopile 138, an anvil 144 is positioned over the flanged portion 140, transferring impact load from a hammer 143 to the monopile 138 through a cushion 142 as may be employed to regulate the impact forces and protect the flange. The gusset plates 134 are adapted to provide the required stiffness to the flanged portion 140 to withstand impact loading by the anvil 144 with minimal deformation.

Figure 13:
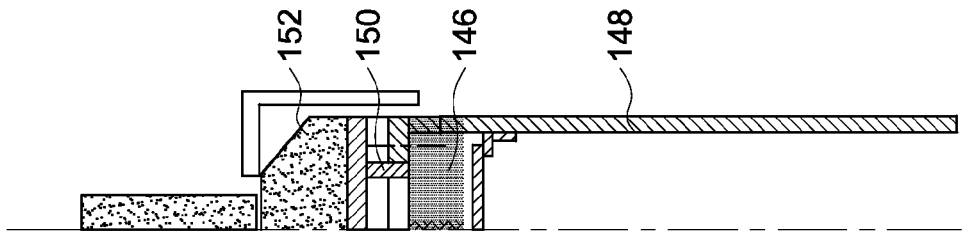
FIG. 13 is a cross-sectional view illustrating a half-section of a flanged monopile having a system of gusset plates and a hammer interface ring to facilitate driving on the gusset plate system, according to aspects of the present technique.
Figure 17:
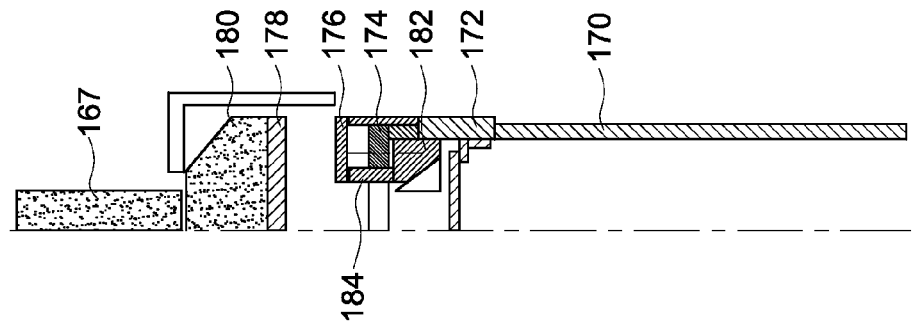
FIG. 17 is a cross-sectional view illustrating a half-section of a flanged monopile having a locally thickened wall to facilitate driving on the inside and outside of the monopile, according to aspects of the present technique.
Figure 16:
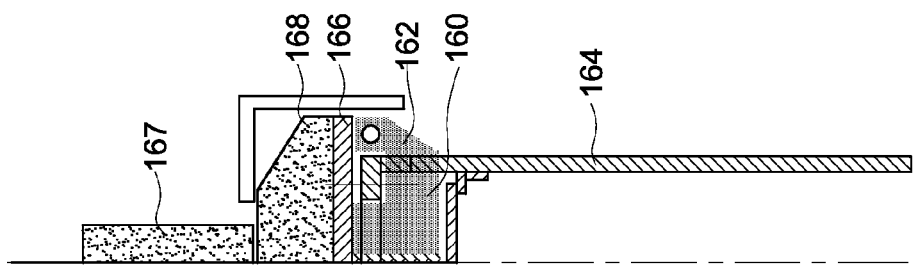
FIG. 16 is a cross-sectional view illustrating a half-section of a flanged monopile having inner and outer gusset plates to facilitate driving on the inside and outside of the monopile, according to aspects of the present technique.
Figure 15:
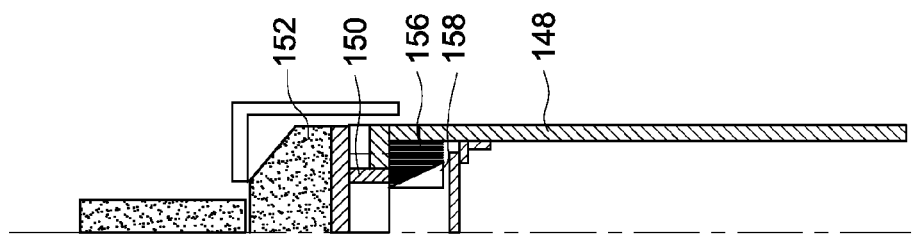
FIG. 15 is a cross-sectional view illustrating a half-section of a flanged monopile having an annular ring-like gusset plate and a hammer interface ring to facilitate driving on the gusset plates, according to aspects of the present technique.
Figure 14:
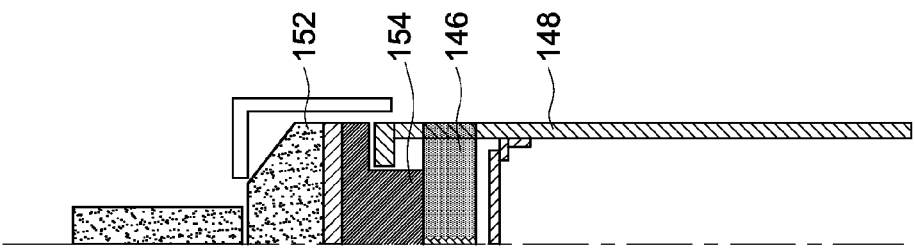
FIG. 14 is a cross-sectional view illustrating a half-section of a flanged monopile having a system of gusset plates and a hammer interface ring to facilitate driving on the gusset plate system, according to aspects of the present technique.

In alternate embodiments, impact loading by the hammer may be borne by the gusset plates instead of the flanged portion. FIGS. 13-17 illustrate exemplary configurations to achieve the same. In FIG. 13, one or more gusset plates 146 are disposed within a monopile 148. An annular hammer interface ring 150 is disposed on the gusset plates 146, which transfers hammer loading from an anvil 152 to the gusset plates 146. In FIG. 14, instead an annular hammer interface ring, a solid hammer interface shoe 154 is provided to transfer hammer loading to the gusset plates 146. In FIG. 15, the gusset plates 156 are configured as annular rings, supported by annular wedge shaped rings 158. In FIG. 16, stiffeners, such as gusset plates 160 and 162 are provided both on the inside and on the outside of the monopile 164 respectively. Here the anvil 168 is in contact with both the inner and outer gusset plates 160 and 162 through a cushion 166, such that impact from the hammer 167 is borne jointly by the inner and outer gusset plates 160 and 162. In FIG. 17, wall-thickness of the monopile 170 is increased locally at a portion 172 below the flanged portion 174 to support a removable flanged member or adapter 176. This arrangement facilitates hammer loading both on the inside and outside of the flanged portion. During hammer loading, the adapter 176 is in contact with a cushion 178 below the anvil 180 which transfer load from the hammer 167 to the gusset plates 182 via hammer interface ring 184 and also to the monopile 170 via the locally thickened wall 172.

The above-described techniques, thus provide a pre-flanged monopile and facilitates a ready mechanical connection of monopile with the superstructure, such as wind turbine tower. Once the superstructure is mounted on the flanged monopile and the substructure, vertical inclination of the superstructure may need to be rectified. As will be appreciated by those skilled in the art, correction of inclination error may be achieved by means of tapered washers secured to the flange. In certain embodiments, wobble sections, which have faces appropriately out of parallel may be advantageously utilized to adjust axial inclinations of the superstructure greater than 0.5 degrees.

Aspects of the present technique may also be used to improve the bearing surface of the monopile. FIG. 18 illustrates a cross-sectional view of a flanged monopile 186 for improved bearing surface according to one embodiment of the present technique. In the illustrated embodiment, a radially inwardly extending flange 188 is provided on an inner surface 190 of the monopile 186 below a mud level 192. Surface 194 of the flange 188 provides the necessary bearing surface to withstand the vertical loading exerted on the monopile 186 by the dead weight of the wind turbine tower, nacelle and the rotor, and other axial loads. The above technique is particularly useful at sites where the soil has a relatively higher degree of fluidity or for guyed monopile foundations.

Figure 19:
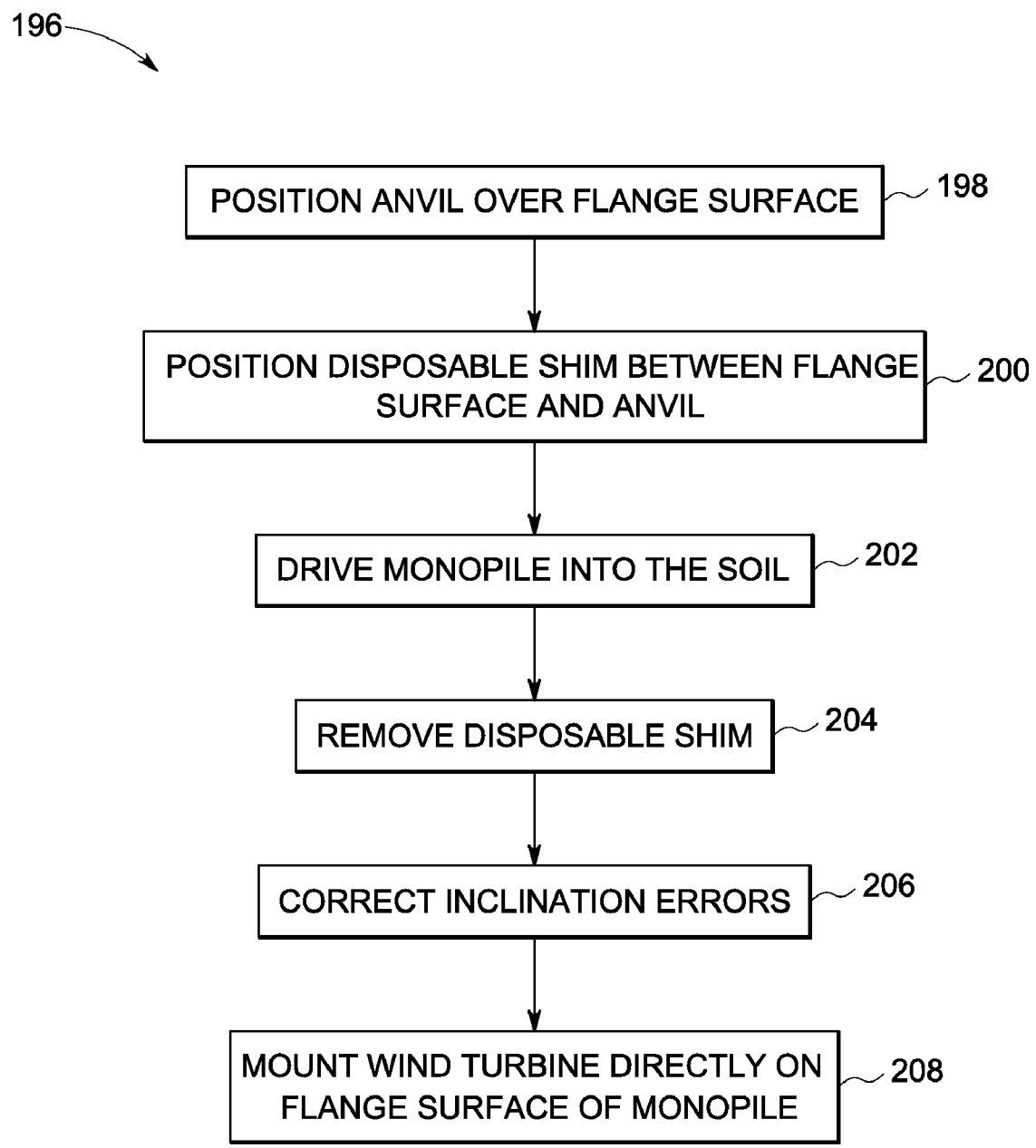
FIG. 19 is a flowchart illustrating an exemplary method for installing an offshore wind turbine, according to aspects of the present technique.

FIG. 19 is a flowchart illustrating an exemplary method 196 for installing an offshore wind turbine, in accordance with aspects of the present technique. The method 196 begins by positioning an anvil over a flanged surface provided on a pre-flanged monopile (block 198). As discussed above, the pre-flanged monopile may comprise top-pile or mid-pile flanged configuration, and may include inward, outward or balanced flanges. In certain embodiments where top-pile flanged configuration is used, a disposable layer of a protective element may be positioned between the anvil and the flange surface (block 200). At block 202, the pre-flanged monopile is driven into the soil. During the process of driving the monopile into the soil, the anvil transmits the energy from a hydraulic hammer to the monopile. In top-pile flanged configurations using a disposable shim, once the driving process is complete, the disposable shim is removed (block 204). The superstructure, including the wind turbine tower, nacelle and rotor is then mounted directly on to the flanged monopile (block 208). Simultaneously during installation, at block 206, axial adjustments may be made to the superstructure installation to correct inclination. As discussed earlier block 206 may involve the use of tapered washers or may employ wobble sections to correct inclination errors greater than 0.5 degrees.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine system, comprising:
a substructure comprising a monopile having a generally cylindrical annular shape and having a primary flanged portion extending radially from a first peripheral surface of the monopile and a secondary flanged portion located below the primary flanged portion, extending radially from a second peripheral surface of the monopile, wherein the primary flanged portion is configured to support a superstructure mounted on the substructure and the secondary flanged portion is configured to bear driving loads on the monopile.

2. The wind turbine system of claim 1, wherein the primary flanged portion comprises a top surface of the monopile.

3. The wind turbine system of claim 1, wherein the superstructure includes a wind turbine.

4. The wind turbine system of claim 1, comprising a further flanged surface extending radially inwardly from an inner surface of the monopile, wherein the flanged surface is located at or below a surface of the ground and is configured to provide a bearing surface to support axial loads on the monopile.

5. A wind turbine system, comprising:
a substructure comprising a monopile insertable into the ground, the monopile having a generally cylindrical and annular shape, the monopile further comprising a flanged surface extending radially inwardly from an inner surface of the monopile, wherein the flanged surface is located at or below a surface of the ground and is configured to provide a bearing surface to support axial loads on the monopile.

6. The wind turbine system of claim 5, wherein the monopile comprises a primary flanged portion extending radially from a first peripheral surface of the monopile and a secondary flanged portion located below the primary flanged portion.

7. The wind turbine system of claim 6, wherein the secondary flanged portion extends radially from a second peripheral surface of the monopile.

8. The wind turbine system of claim 7, wherein the primary flanged portion is configured to support a superstructure mounted on the substructure and the secondary flanged portion is configured to bear driving loads on the monopile.

9. The wind turbine system of claim 8, wherein the primary flanged portion comprises a top surface of the monopile.

10. The wind turbine system of claim 8, wherein the superstructure includes a wind turbine.

11. The wind turbine system of claim 5, comprising an intermediate flanged portion located intermediate a top end and a bottom end of the monopile.

12. The wind turbine system of claim 11, wherein the intermediate flanged portion is configured to receive a wind turbine tower.

13. The wind turbine system of claim 11, wherein the intermediate flanged portion extends radially from a peripheral outward surface of the monopile.

14. A wind turbine system, comprising:
a substructure comprising a monopile having a generally cylindrical annular shape and having a primary flanged portion extending radially from a first peripheral surface of the monopile and a secondary flanged portion located below the primary flanged portion, extending radially from a second peripheral surface of the monopile, wherein the primary flanged portion is configured to support a superstructure mounted on the substructure and the secondary flanged portion is configured to bear driving loads on the monopile, the substructure further a flanged surface extending radially inwardly from an inner surface of the monopile, wherein the flanged surface is located at or below a surface of the ground and is configured to provide a bearing surface to support axial loads on the monopile.

15. The wind turbine system of claim 14, wherein the primary flanged portion comprises a top surface of the monopile.

16. The wind turbine system of claim 14, wherein the superstructure includes a wind turbine.

* * * * *